United States Patent
Yanakiev et al.

(10) Patent No.: US 7,321,820 B2
(45) Date of Patent: Jan. 22, 2008

(54) MODEL-BASED INLET AIR DYNAMICS STATE CHARACTERIZATION

(75) Inventors: Ognyan N. Yanakiev, Canton, MI (US); Chan-Chiao Lin, Ann Arbor, MI (US); Sherif H. El Tahry, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 28 days.

(21) Appl. No.: 11/342,925

(22) Filed: Jan. 30, 2006

(65) Prior Publication Data

US 2007/0175452 A1 Aug. 2, 2007

(51) Int. Cl.
G06F 17/00 (2006.01)
F02N 25/07 (2006.01)
F02B 47/08 (2006.01)

(52) U.S. Cl. .................. 701/105; 701/104; 701/108; 123/480; 123/568.16; 123/568.21

(58) Field of Classification Search .............. 123/478, 123/480, 568.11, 568.16, 568.21, 500–502; 73/117.3, 118.1; 701/101–105, 108; 60/605.2
See application file for complete search history.

(56) References Cited

U.S. PATENT DOCUMENTS

| | | | | | |
|---|---|---|---|---|---|
| 4,432,331 A | * | 2/1984 | Yasuhara | ............... | 123/568.16 |
| 5,241,937 A | * | 9/1993 | Kanehiro et al. | ...... | 123/406.27 |
| 5,682,864 A | * | 11/1997 | Shirakawa | ............. | 123/568.21 |
| 5,950,604 A | * | 9/1999 | Inamijima | ............... | 123/568.11 |
| 5,964,820 A | * | 10/1999 | Miwa et al. | ................. | 701/108 |
| 6,012,431 A | * | 1/2000 | Itoyama et al. | ............. | 701/108 |
| 6,167,342 A | * | 12/2000 | Itoyama et al. | ............. | 701/104 |
| 6,298,299 B1 | * | 10/2001 | Itoyama et al. | ............. | 701/101 |
| 6,659,091 B2 | * | 12/2003 | Wild et al. | ............. | 123/568.16 |
| 7,163,007 B2 | * | 1/2007 | Sasaki et al. | ................ | 123/480 |
| 2007/0073467 A1 | * | 3/2007 | Hill et al. | .................... | 701/105 |

FOREIGN PATENT DOCUMENTS

| JP | 09280117 A | * | 10/1997 | .................. 701/108 |
|---|---|---|---|---|
| JP | 2002309972 A | * | 10/2002 | .................. 701/108 |

* cited by examiner

Primary Examiner—Willis R. Wolfe, Jr.

(57) ABSTRACT

An engine control system that having an exhaust gas recirculation (EGR) valve includes a first module that determines an EGR error and a second module that calculates a fuel injection timing based on the EGR error. Operation of an engine is regulated based on the fuel injection timing to reduce emissions during transient operation of the engine.

22 Claims, 4 Drawing Sheets

MODEL-BASED INLET AIR DYNAMICS STATE CHARACTERIZATION

FIELD OF THE INVENTION

The present invention relates to internal combustion engines, and more particularly to a combustion control for reducing engine emissions.

BACKGROUND OF THE INVENTION

Internal combustion engines combust an air and fuel mixture to generate drive torque. More specifically, air is drawn into the engine and is mixed with fuel. The air and fuel mixture is combusted within cylinders to drive a crankshaft, producing drive torque. Mass airflow into the engine and the quantity of fuel injected determine the amount of drive torque generated.

Some engines include exhaust gas recirculation (EGR) systems to improve engine operation and reduce engine emissions. The EGR system includes an EGR valve that regulates an amount of exhaust gas that is circulated back to the intake manifold. The additional exhaust gas affects the amount of engine air intake through the throttle. EGR is the most efficient means to reduce overall emissions. Large amounts of EGR (e.g., up to 60%) may be necessary to sufficiently reduce the emissions to meet regulatory requirements.

During transient maneuvers, the required amount of EGR and the actually achieved EGR may differ as a result of delays in the engine system. In some cases, the difference could be quite significant, which can result in an unacceptable increase in emissions (i.e., $NO_x$ and HC) during transient maneuvers.

SUMMARY OF THE INVENTION

Accordingly, the present invention provides an engine control system that includes an exhaust gas recirculation (EGR) valve. The engine control system further includes a first module that determines an EGR error and a second module that calculates a fuel injection timing based on the EGR error. Operation of an engine is regulated based on the fuel injection timing to reduce emissions during transient operation of the engine.

In other features, the second module calculates the fuel injection timing based on a time constant and a base fuel injection timing. The engine control system further includes a third module that determines the time constant based on the EGR error. The base fuel injection timing is determined based on an engine speed and torque.

In still other features, the first module determines the EGR error based on an EGR set-point and an estimated EGR. The engine control system further includes a third module that determines an EGR estimate based on a mass air flow (MAF) and a charge flow (CF). The MAF is determined using a MAF sensor and the CF is determined based on an engine speed, a manifold absolute pressure (MAP), an intake manifold temperature and a volumetric efficiency of the engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
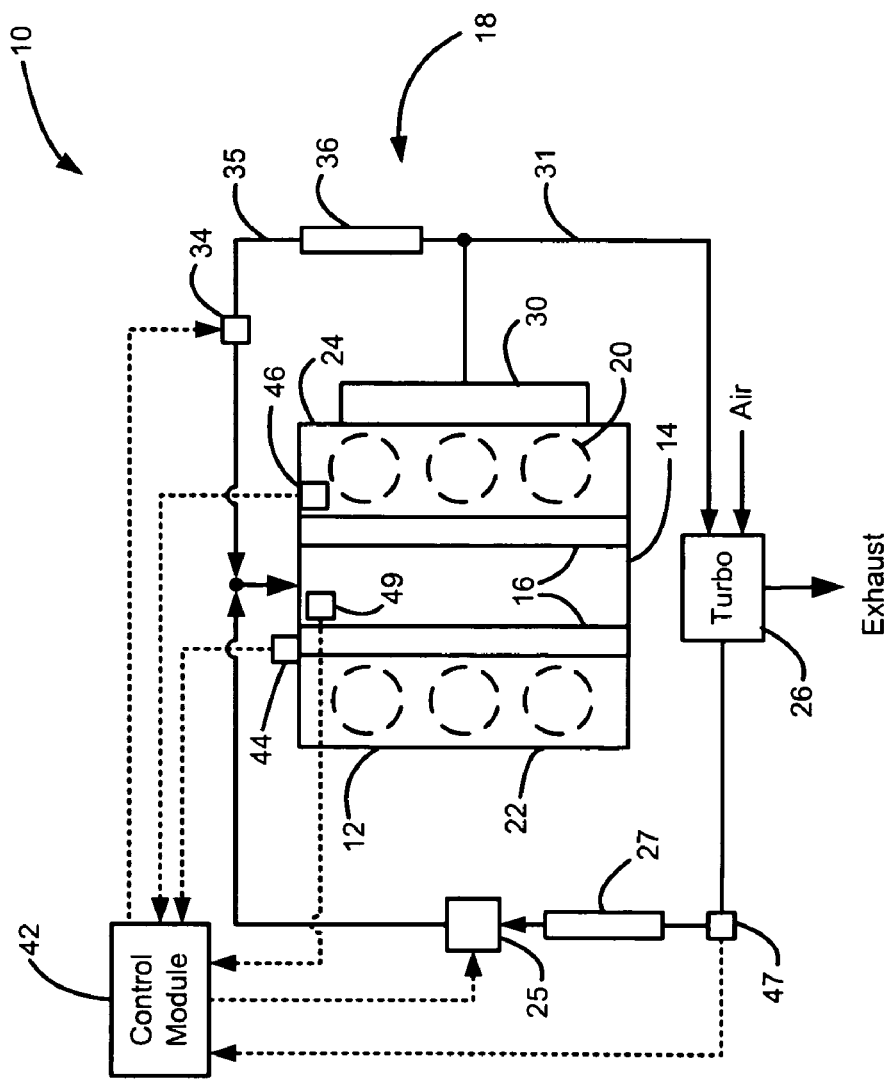
FIG. 1 is a functional block diagram of an exemplary engine system that is regulated based on the combustion control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is schematically illustrated in accordance with the present invention. The engine system 10 includes an engine 12, an intake manifold 14, a fuel injection system 16 and an exhaust system 18. The exemplary engine 12 includes six cylinders 20 configured in adjacent cylinder banks 22, 24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is further appreciated that the engine 12 is exemplary in nature an inline-type cylinder configuration is also contemplated.

Air is drawn into the intake manifold 14 through a throttle 25 and a filter 27. Air is drawn into the cylinders 20 from the intake manifold 14 and is compressed therein. Fuel is injected by the injection system 16 and the air/fuel mixture is combusted within the cylinders 20. The exhaust gases are exhausted from the cylinders 20 and into the exhaust system 18. In some instances, the engine system 10 can include a turbo 26 that pumps additional air into the cylinders 20. In such a system, the turbo 26, which is driven by the exhaust gas, compresses the air and the compressed air flows through the throttle 25.

The exhaust system 18 includes an exhaust manifold 30, an exhaust conduit 31, an EGR valve 34, an EGR conduit 35 and an EGR cooler 36. The exhaust manifold 30 directs the exhaust from the cylinder banks 22, 24 into the exhaust conduit 31. The EGR valve 34 selectively re-circulates a portion of the exhaust through the EGR conduit 35, as explained in further detail below. The remainder of the exhaust is directed into the turbo 26 to drive the turbo 26. The exhaust stream flows from the turbo 26 to an exhaust after-treatment system (not illustrated).

A control module 42 regulates operation of the engine system 10 based on the combustion control of the present invention. More specifically, the control module 42 controls operation of both the fuel injection timing (i.e., the point at which fuel is injected into a cylinder relative to a crank angle and a piston position within the cylinder) and the EGR valve 34. The control module 42 communicates with an intake manifold absolute pressure (MAP) sensor 44 and an engine speed sensor 46. The MAP sensor 44 generates a signal indicating the air pressure within the intake manifold 14 and the engine speed sensor 46 generates a signal indicating engine speed (RPM). The control module 42 determines an engine load based on the RPM and fueling rates. The control module 42 also communicates with a mass airflow (MAF) sensor 47 that generates a MAF signal and an intake manifold temperature sensor 49 that is responsive to the intake manifold air temperature ($T_{IM}$).

The combustion control of the present invention regulates the EGR valve 34 and the fuel injection timing to minimize emission excursions during transient engine operation. As used herein, the term transient refers to a transition in engine operation from a first steady-state condition to a second steady-state condition. The combustion control adjusts the fuel injection timing based on an EGR error ($EGR_{ERR}$). $EGR_{ERR}$ is calculated as the difference between an estimated actual EGR rate ($EGR_{EST}$) and a set-point EGR rate ($EGR_{SP}$). $EGR_{EST}$ is estimated based on the difference of MAF and an estimated charge flow (CF). MAF is measured directly using the MAF sensor 47. CF is calculated using a speed-density relationship as a function of $T_{IM}$, MAP, engine RPM and the volumetric efficiency ($V_{EFF}$) of the engine. $EGR_{SP}$ is determined based on engine RPM and torque using a pre-determined look-up table stored in memory.

The combustion control determines a base injection timing ($INJ_{BASE}$) from a main injection timing schedule. More specifically, $INJ_{BASE}$ is determined based on engine RPM and torque using a pre-determined look-up table stored in memory. An actual injection timing ($INJ_{ACT}$) is determined based on $INJ_{BASE}$ and $EGR_{ERR}$. More specifically, a timing constant ($k_{TIME}$) is determined based on $EGR_{ERR}$ using a pre-determined look-up table stored in memory. $k_{TIME}$ is applied to $INJ_{BASE}$ using dynamics such as filtering. For example, time-variable first order filter can be applied to $INJ_{BASE}$ using $k_{TIME}$ to determine $INJ_{ACT}$. In this manner, no additional timing calibration is required. Alternatively, $INJ_{ACT}$ can be determined from a pre-determined look-up table based on $EGR_{ERR}$ and $INJ_{BASE}$, and a filter can be applied to the table output.

When operating in steady-state, the filter does not affect $INJ_{BASE}$, whereby $INJ_{ACT}$ is equal to $INJ_{BASE}$. However, when transient, the filter adjusts $INJ_{BASE}$ to provide $INJ_{ACT}$. In this manner, the Combustion control of the present invention automatically determines when the engine is operating in transient state.

Fuel injection timing is a more rapid engine operation actuator as compared to EGR and has sufficient control authority to affect HC and $NO_x$ during deviations of $EGR_{EST}$ from $EGR_{SP}$. As a result, active and efficient reduction of emissions is enabled using $INJ_{ACT}$ as the control parameter based on $EGR_{ERR}$. Further, the combustion control of the present invention is operable throughout the entire engine operating region and eliminates the need for switching logic between different modes of combustion (e.g., low temperature combustion, diffusion combustion, partial HCCl combustion) by providing seamless transitions therebetween.

Figure 2:
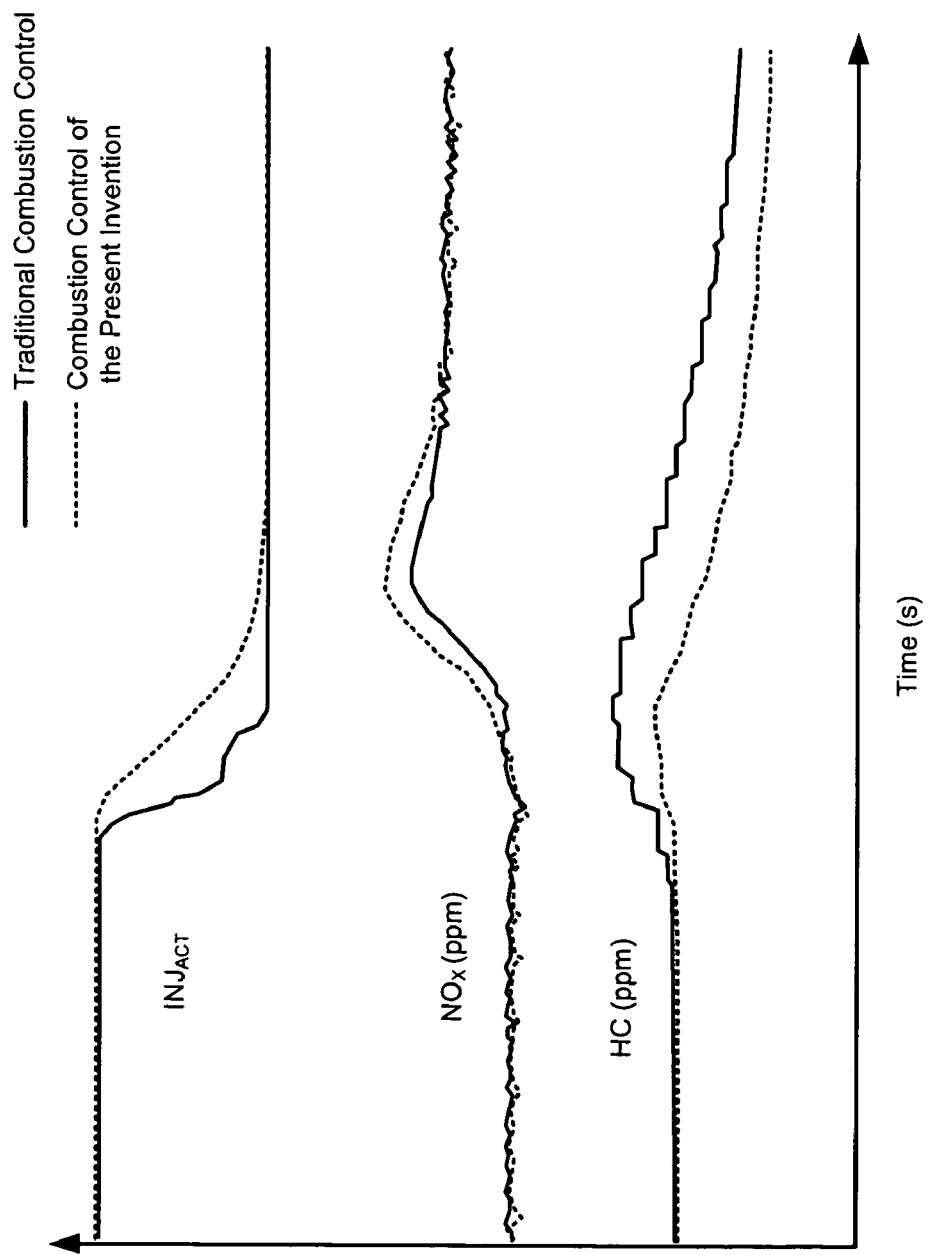
FIG. 2 illustrates exemplary injection timing, $NO_x$ and HC traces during an exemplary vehicle maneuver comparing traditional Combustion control to the combustion control of the present invention.

Referring now to FIG. 2, exemplary injection timing ($INJ_{ACT}$), $NO_x$ and HC traces are illustrated for an exemplary transient engine operation (e.g., acceleration). In the graph of FIG. 2, the solid line indicates of traditional combustion control, while the dashed line indicates the combustion control in accordance with the present invention. As illustrated, $INJ_{ACT}$ using the combustion control of the present invention is advanced relative to that using traditional combustion control. As a result, $NO_x$ emissions are slightly increased over that produced using the traditional combustion control, however, HC emissions are significantly reduced using the combustion control of the present invention.

Figure 3:
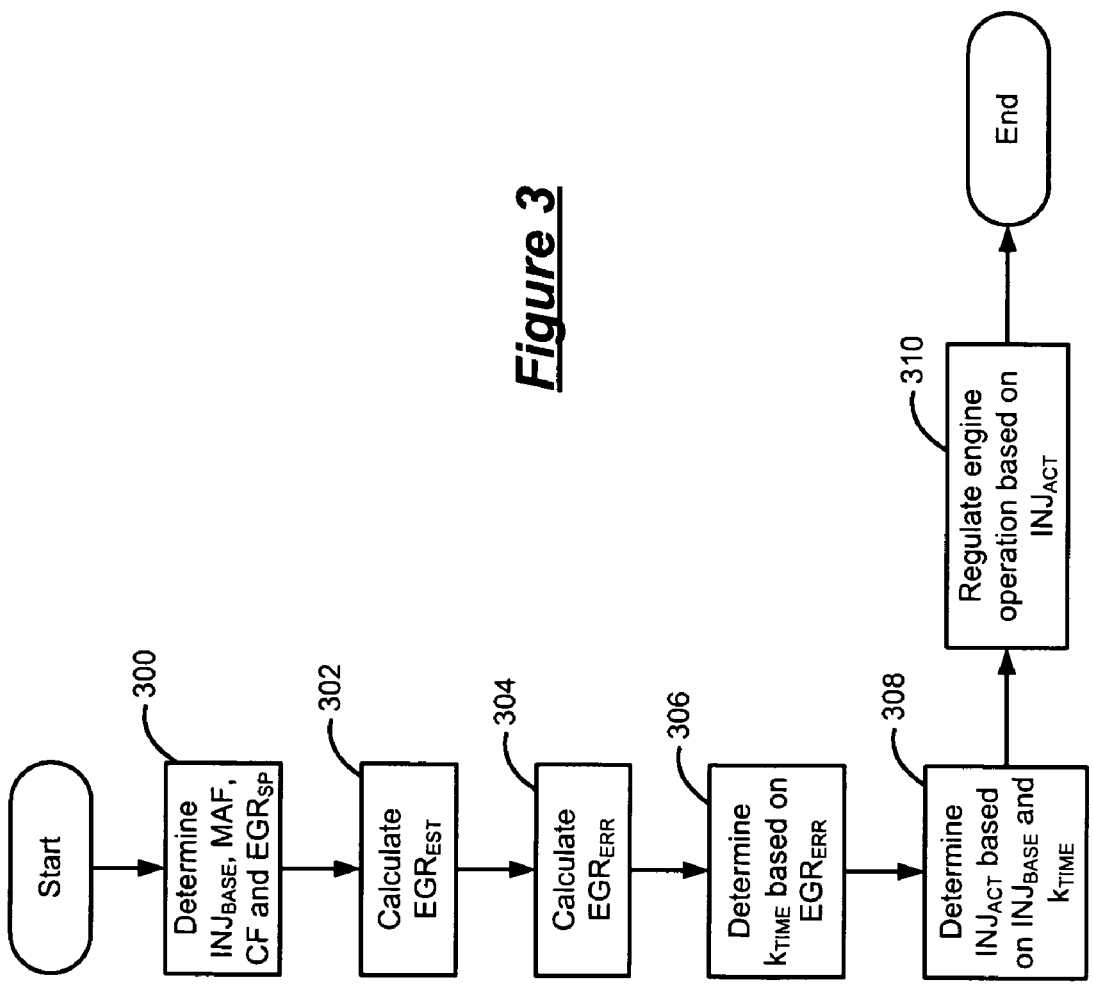
FIG. 3 is a flowchart illustrating exemplary steps executed by the combustion control of the present invention.

Referring now to FIG. 3, exemplary steps executed by the combustion control of the present invention will be described in detail. In step 300, control determines $INJ_{BASE}$, MAF, CF and $EGR_{SP}$. In step 302, control calculates $EGR_{EST}$ based on MAF and CF. Control calculates $EGR_{ERR}$ based on $EGR_{SP}$ and $EGR_{EST}$ in step 304 and determines $k_{TIME}$ based on $EGR_{ERR}$ in step 306. In step 308, control determines $INJ_{ACT}$ based on $INJ_{BASE}$ and $k_{TIME}$. Control regulates operation of the engine based on $INJ_{ACT}$ in step 310 and control ends.

Figure 4:
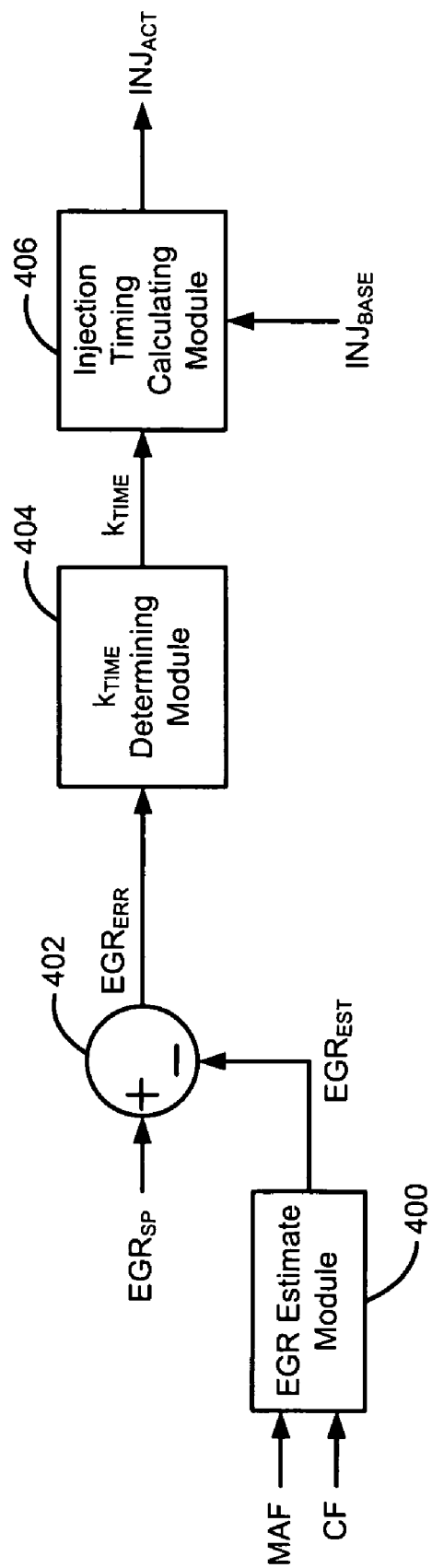
FIG. 4 is a functional block diagram of exemplary modules that execute the combustion control of the present invention.

Referring now to FIG. 4, exemplary modules that execute the combustion control will be described in detail. The exemplary modules include an EGR estimating module 400, a summer 402, a $k_{TIME}$ determining module 404 and an injection timing calculating module 406. The EGR estimating module 400 determines $EGR_{EST}$ based on MAF and CF. The summer 402 determines $EGR_{ERR}$ based on $EGR_{SP}$ and $EGR_{EST}$. $k_{TIME}$ is determined by the $k_{TIME}$ determining module 404 based on $EGR_{ERR}$. The injection timing calculating module 406 calculates $INJ_{ACT}$ based on $k_{TIME}$ and $INJ_{BASE}$. The engine 12 is subsequently operated based on $INJ_{ACT}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system that includes an exhaust gas recirculation (EGR) valve, comprising:
    a first module that determines an EGR error; and
    a second module that calculates a fuel injection timing based on said EGR error, wherein operation of an engine is regulated based on said fuel injection timing to reduce emissions during transient operation.

2. A method of reducing emissions from an engine having an exhaust gas recirculation (EGR) system during transient operation, comprising:
    determining an EGR error;
    calculating a fuel injection timing based on said EGR error; and
    regulating operation of said engine during transient operation based on said fuel injection timing.

3. An engine control system that includes an exhaust gas recirculation (EGR) valve, comprising:
    a first module that determines an EGR error; and
    a second module that calculates a fuel injection timing based on said EGR error, a time constant and a base fuel injection timing, wherein operation of an engine is regulated based on said fuel injection timing, to reduce emissions during transient operation.

4. The engine control system of claim 3 further comprising a third module that determines said time constant based on said EGR error.

5. The engine control system of claim 3 wherein said base fuel injection timing is determined based on an engine speed and torque.

6. An engine control system that includes an exhaust gas recirculation (EGR) valve, comprising:
 a first module that determines an EGR error based on an EGR set-point and an estimated EGR; and
 a second module that calculates a fuel injection timing based on said EGR error, wherein operation of an engine is regulated based on said fuel injection timing to reduce emissions during transient operation.

7. The engine control system of claim 6 further comprising a third module that determines an EGR estimate based on a mass air flow (MAF) and a charge flow (CF).

8. The engine control system of claim 7 wherein said MAF is determined using a MAF sensor and said CF is determined based on an engine speed, a manifold absolute pressure (MAP), an intake manifold temperature and a volumetric efficiency of said engine.

9. A method of reducing emissions from an engine having an exhaust gas recirculation (EGR) system during transient operation, comprising:
 determining an EGR error;
 calculating a fuel injection timing based on said EGR error, a time constant and a base fuel injection timing; and
 regulating operation of said engine based on said fuel injection timing.

10. The method of claim 9 further comprising determining said time constant based on said EGR error.

11. The method of claim 9 wherein said base fuel injection timing is determined based on an engine speed and torque.

12. A method of reducing emissions from an engine having an exhaust gas recirculation (EGR) system during transient operation, comprising:
 determining an EGR error based on an EGR set-point and an estimated EGR; and
 regulating operation of said engine based on said fuel injection timing.

13. The method of claim 12 further comprising determining said EGR estimate based on a mass air flow (MAF) and a charge flow (CF).

14. The method of claim 13 wherein said MAF is determined using a MAF sensor and said CF is determined based on an engine speed, a manifold absolute pressure (MAP), an intake manifold temperature and a volumetric efficiency of said engine.

15. A method of reducing emissions from an engine having an exhaust gas recirculation (EGR) system during transient operation, comprising:
 determining an FOR error;
 determining a base fuel injection timing;
 filtering said base fuel injection timing based on said FOR error to determine a fuel injection timing; and
 regulating operation of said engine based on said fuel injection timing.

16. The method of claim 15 wherein said filtering is achieved using a first order filter.

17. The method of claim 15 wherein said fuel injection timing is calculated based on a time constant and said base fuel injection timing.

18. The method of claim 17 further comprising determining said time constant based on said EGR error.

19. The method of claim 15 wherein said base fuel injection timing is determined based on an engine speed and torque.

20. The method of claim 15 wherein said EGR error is determined based on an EGR set-point and an estimated EGR.

21. The method of claim 20 further comprising determining said EGR estimate based on a mass air flow (MAF) and a charge flow (CF).

22. The method of claim 21 wherein said MAE is determined using a MAF sensor and said CF is determined based on an engine speed, a manifold absolute pressure (MAP), an intake manifold temperature and a volumetric efficiency of said engine.

* * * * *